United States Patent
Ormond

(10) Patent No.: US 7,996,477 B2
(45) Date of Patent: Aug. 9, 2011

(54) SYSTEM AND METHOD FOR DOCUMENT PROCESSING DEVICE OPERATION MONITORING

(75) Inventor: Louis Ormond, Irvine, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 154 days.

(21) Appl. No.: 12/394,522

(22) Filed: Feb. 27, 2009

(65) Prior Publication Data

US 2009/0222723 A1 Sep. 3, 2009

Related U.S. Application Data

(60) Provisional application No. 61/032,675, filed on Feb. 29, 2008.

(51) Int. Cl.
*G06F 15/16* (2006.01)
(52) U.S. Cl. ......... 709/206; 709/203; 709/219; 709/226
(58) Field of Classification Search .................. 709/203, 709/206, 219, 225
See application file for complete search history.

(56) References Cited

U.S. PATENT DOCUMENTS

| | | | |
|---|---|---|---|
| 5,740,368 A | 4/1998 | Villalpando | |
| 7,043,551 B2 | 5/2006 | Motoyama et al. | |
| 7,047,293 B2 | 5/2006 | Motoyama et al. | |
| 7,120,674 B1 | 10/2006 | Motoyama et al. | |
| 7,225,244 B2 | 5/2007 | Reynolds et al. | |
| 7,231,438 B1 | 6/2007 | Kikuchi | |
| 7,237,015 B1 | 6/2007 | Ochiai et al. | |
| 7,266,601 B2 | 9/2007 | Maekawa et al. | |
| 7,293,081 B2 | 11/2007 | Motoyama et al. | |
| 7,296,079 B2 | 11/2007 | Motoyama et al. | |
| 7,337,242 B1 | 2/2008 | Motoyama et al. | |
| 7,349,638 B2 * | 3/2008 | Mima | 399/24 |
| 7,353,273 B2 | 4/2008 | Motoyama et al. | |
| 7,356,579 B1 | 4/2008 | Motoyama et al. | |
| 7,359,969 B2 | 4/2008 | Motoyama et al. | |
| 7,376,728 B1 | 5/2008 | Motoyama et al. | |
| 7,379,991 B2 | 5/2008 | Muto | |
| 7,383,359 B2 | 6/2008 | Motoyama et al. | |
| 7,392,310 B2 | 6/2008 | Motoyama et al. | |
| 7,421,474 B2 | 9/2008 | Motoyama et al. | |
| 7,426,748 B2 | 9/2008 | Imai | |
| 7,428,577 B2 | 9/2008 | Muto | |
| 7,437,436 B2 | 10/2008 | Higuchi | |
| 7,444,400 B2 | 10/2008 | Hara et al. | |
| 7,447,790 B2 | 11/2008 | Motoyama et al. | |
| 7,725,728 B2 * | 5/2010 | Ama et al. | 713/181 |

(Continued)

*Primary Examiner* — Phuoc Nguyen
(74) *Attorney, Agent, or Firm* — SoCal IP Law Group LLP; Steven C. Sereboff; Jonathan Pearce

(57) ABSTRACT

The subject application is directed to a system and method for document processing device operation monitoring. Operational data is first communicated between document processing devices on one of a plurality of networks, each network having an assigned audit server from among a plurality of audit servers. Operational data is received into each audit server from each document processing device in its associated network. The audit servers output operational data from each document processing device in a thin client language via attachment to an e-mail. A data server receives the e-mail from each audit server and parses the operational data from each received e-mail. The parsed data is then stored in a database associated with the data server. The data server then generates a device report in accordance with a query to the database.

18 Claims, 11 Drawing Sheets

U.S. PATENT DOCUMENTS

| | | | |
|---|---|---|---|
| 2003/0093531 A1* | 5/2003 | Yeung et al. | 709/226 |
| 2003/0093556 A1* | 5/2003 | Yeung et al. | 709/238 |
| 2003/0200234 A1* | 10/2003 | Koppich et al. | 707/203 |
| 2004/0039809 A1* | 2/2004 | Ranous et al. | 709/223 |
| 2005/0028073 A1* | 2/2005 | Henry et al. | 715/500 |
| 2006/0198653 A1* | 9/2006 | Plewnia et al. | 399/79 |
| 2007/0073862 A1 | 3/2007 | Motoyama et al. | |
| 2007/0073865 A1 | 3/2007 | Motoyama et al. | |
| 2007/0094397 A1* | 4/2007 | Krelbaum et al. | 709/227 |
| 2008/0184207 A1 | 7/2008 | Motoyama et al. | |
| 2008/0189411 A1 | 8/2008 | Motoyama et al. | |
| 2009/0096621 A1* | 4/2009 | Ferlitsch | 340/635 |

* cited by examiner

SYSTEM AND METHOD FOR DOCUMENT PROCESSING DEVICE OPERATION MONITORING

CROSS-REFERENCE TO RELATED APPLICATIONS

This Application claims priority to U.S. Provisional Patent Application Ser. No. 61/032,675, titled A SYSTEM AND METHOD FOR AUDIT REPORT GENERATION VIA A WEB-BASED THIN-CLIENT INTERFACE, filed on Feb. 29, 2008, the entirety of which is incorporated herein.

BACKGROUND OF THE INVENTION

The subject application is directed generally to document processing device fleet management. More particularly, the subject application is directed to generating reports of document processing device operations via a thin-client interface. In particular, the subject application is directed to a system and method for document processing device operation monitoring.

Document processing devices are in widespread use today and include copiers, printers, scanners, facsimile machines, plotters, electronic mail gateways, and the like. More recently, two or more of such machine functions have been combined into a single device, referred to as a multifunction peripheral or MFP. Many enterprises will distribute document processing devices throughout an office, within a building, among multiple buildings, or among multiple locations. In such circumstances, monitoring or auditing of each device is required so as to ascertain usage data, resource consumption, user preference data, and other such operational information. This information is typically collated into one or more reports so that the enterprise is able to determine costs of ownership, device utilization, user usage, and the like. The acquisition and collation of such information is a time-consuming process, requiring significant amounts of effort on the part of the enterprise. Furthermore, real-time acquisition and report generation of such information is not automatically available to the enterprise as such information must first be collected, in some instances manually, by dedicated technicians or personnel.

SUMMARY OF THE INVENTION

In accordance with one embodiment of the subject application, there is provided a system and method for document processing device operation monitoring. Operational data is first communicated between document processing devices on one of a plurality of networks with an assigned audit server from among a plurality of audit servers. Operational data is then received into each of the audit servers from each document processing device in its associated network. Each audit server then outputs operational data from each associated document processing devices in a thin client language via attachment to an associated e-mail. A data server then receives the e-mail from each audit server and parses the operational data from each e-mail received from the audit server. The parsed data is then stored in a database associated with the data server. The data server then generates a device report in accordance with a query to the database.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for document processing device fleet management. In particular, the subject application is directed to a system and method for generating reports of document processing device operations via a thin-client interface. More particularly, the subject application is directed to a system and method for document processing device operation monitoring. It will become apparent to those skilled in the art that the system and method described herein are suitably adapted to a plurality of varying electronic fields employing remote auditing, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
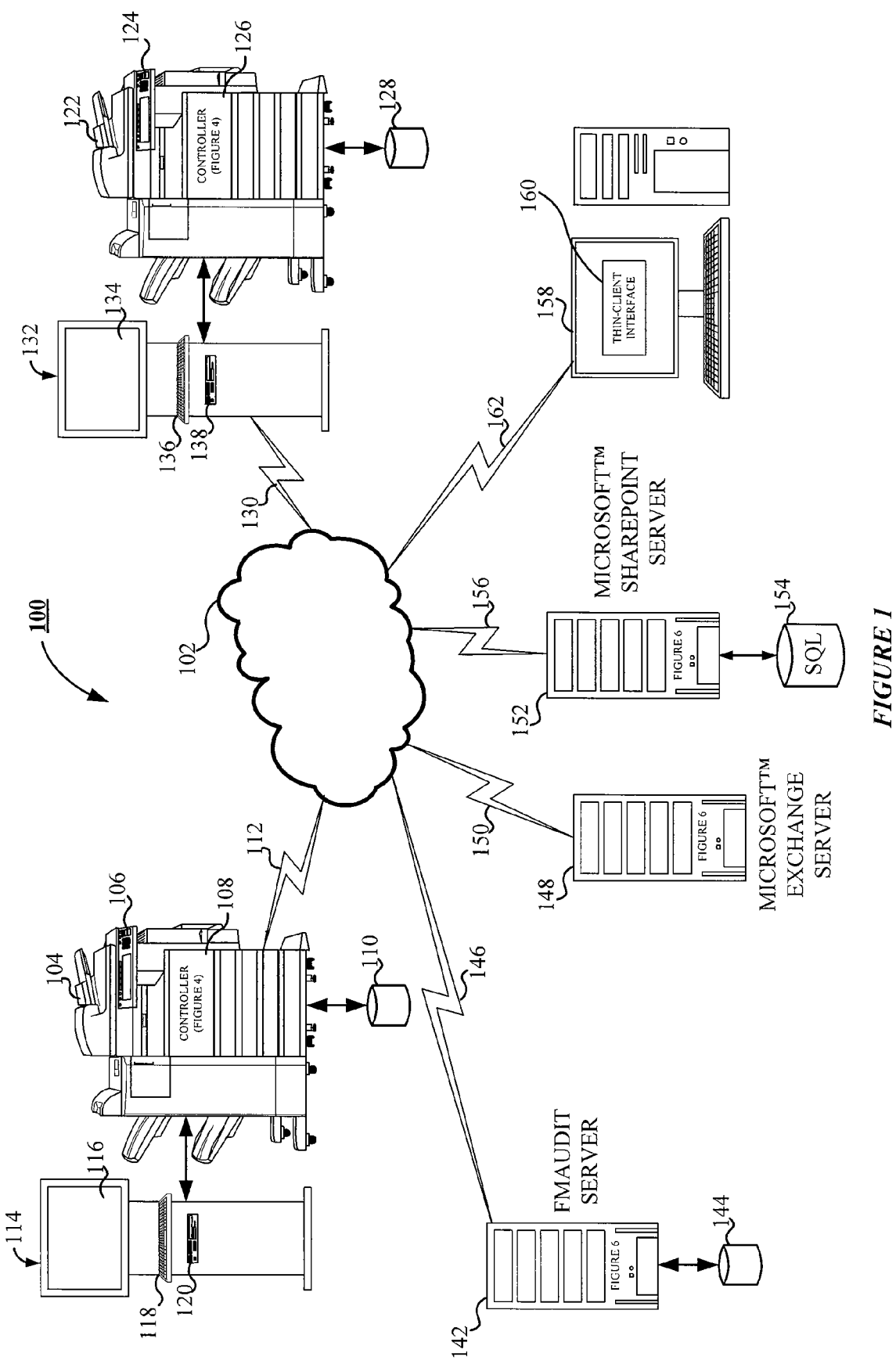
FIG. 1 is an overall diagram of a system for document processing device operation monitoring according to one embodiment of the subject application.

Referring now to FIG. 1, there is shown an overall diagram of an example system 100 for document processing device operation monitoring in accordance with one embodiment of the subject application. It will be understood by those skilled in the art that the system 100 depicted in FIG. 1 is representative of one of a plurality of such systems, networks, or the like, capable of implementation in accordance with the systems and methods of the subject application. Thus, the skilled artisan will appreciate that while a single data network is depicted in FIG. 1, a plurality of such systems is equally capable of implementation in accordance with the subject application.

As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also includes a first document processing device 104 and a second document processing device 122, which are depicted in FIG. 1 as multifunction peripheral devices, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document processing devices include, for example and without limitation, the Toshiba e-Studio Series Controller. In accordance with one aspect of the subject application, the document processing devices 104 and 122 are suitably adapted to provide remote document processing services to external or network devices. Preferably, the document processing devices 104 and 122 include hardware, software, and any suitable combination thereof, configured to interact with an associated user, a networked device, or the like. The functioning of the document processing devices 104 and 122 will better be understood in conjunction with the block diagrams illustrated in FIGS. 2 and 3, explained in greater detail below.

According to one embodiment of the subject application, the document processing devices 104 and 122 are suitably equipped to receive a plurality of portable storage media, including, without limitation, Firewire drive, USB drive, SD, MMC, XD, Compact Flash, Memory Stick, and the like. In the preferred embodiment of the subject application, the document processing devices 104 and 122 further include associated user interfaces 106 and 124, such as touch-screens, LCD displays, touch-panels, alpha-numeric keypads, or the like, via which an associated user is able to interact directly with the respective document processing device 104 or 122. In accordance with the preferred embodiment of the subject application, the user interfaces 106 and 124 are advantageously used to communicate information to the associated user and receive selections from the associated user. The skilled artisan will appreciate that the user interfaces 106 and 124 comprise various components, suitably adapted to present data to the associated user, as are known in the art. In accordance with one embodiment of the subject application, each of the user interfaces 106 and 124 comprises a display, suitably adapted to display one or more graphical elements, text data, images, or the like, to an associated user, receive input from the associated user, and communicate the same to a backend component, such as the controllers 108 and 126, as explained in greater detail below. Preferably, the document processing devices 104 and 122 are communicatively coupled to the computer network 102 via corresponding communications links 112 and 130. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

In accordance with one embodiment of the subject application, each of the document processing devices 104 and 122 further incorporates a backend component, designated as the controllers 108 and 126, suitably adapted to facilitate the operations of the corresponding document processing device 104 and 122, as will be understood by those skilled in the art. Preferably, the controllers 108 and 126 are embodied as hardware, software, or any suitable combination thereof, configured to control the operations of the associated document processing device 104 or 122, facilitate the display of images via the user interface 106 or 124, direct the manipulation of electronic image data, and the like. For purposes of explanation, the controllers 108 and 126 are used to refer to any myriad of components associated with the document processing devices 104 and 122, including hardware, software, or combinations thereof, functioning to perform, cause to be performed, control, or otherwise direct the methodologies described hereinafter. It will be understood by those skilled in the art that the methodologies described with respect to the controllers 108 and 126 are capable of being performed by any general purpose computing system, known in the art, and thus the controllers 108 and 126 are representative of such general computing devices and are intended as such when used hereinafter. Furthermore, the use of the controllers 108 and 126 hereinafter is for the example embodiment only, and other embodiments, which will be apparent to one skilled in the art, are capable of employing the system and method for document processing device operation monitoring of the subject application. The functioning of the controllers 108 and 126 will better be understood in conjunction with the block diagrams illustrated in FIGS. 4 and 5, explained in greater detail below.

Communicatively coupled to the document processing devices 104 and 122 are corresponding data storage devices 110 and 128. In accordance with the preferred embodiment of the subject application, the data storage devices 110 and 128 are any mass storage devices known in the art including, for example and without limitation, magnetic storage drives, a hard disk drive, optical storage devices, flash memory devices, or any suitable combination thereof. In the preferred embodiment, the data storage devices 110 and 128 are suitably adapted to store document data, image data, electronic database data, or the like. It will be appreciated by those skilled in the art that while illustrated in FIG. 1 as being separate components of the system 100, the data storage devices 110 and 128 are capable of being implemented as an internal storage component of the associated document processing device 104 or 122, a component of the controllers 108 or 126, or the like, such as, for example and without limitation, an internal hard disk drive, or the like. In accordance with one embodiment of the subject application, the data storage devices 110 and 128 are capable of storing images, advertisements, user information, location information, output templates, mapping data, multimedia data files, fonts, and the like.

Illustrated in FIG. 1 are a first kiosk 114, communicatively coupled to the first document processing device 104, and in effect, the computer network 102, and a second kiosk 132, communicatively coupled to the second document processing device 122, and in effect, the computer network 102. It will be appreciated by those skilled in the art that the kiosks 114 and 132 are capable of being implemented as separate component of the respective document processing devices 104 and 122, or as integral components thereof. Use of the kiosks 114 and 132 in FIG. 1 are for example purposes only, and the skilled artisan will appreciate that the subject application is capable of implementation without the use of kiosks 114 and 132. In accordance with one embodiment of the subject application, the kiosks 114 and 132 include respective displays 116 and 134 and user input devices 118 and 136. As will be understood by those skilled in the art the kiosks 114 and 132 are capable of implementing a combination user input device/display, such as a touch screen interface. According to one embodiment of the subject application, the kiosks 114 and 132 are suitably adapted to display prompts to an associated user, receive instructions from the associated user, receive payment data, receive selection data from the associated user, and the like. Preferably, the kiosks 114 and 132 include a magnetic card reader, conventional bar code reader, or the like, suitably adapted to receive and read payment data from a credit card, coupon, debit card, or the like.

The system 100 of FIG. 1 also includes portable storage device readers 120 and 138, coupled to the kiosks 114 and 132 and suitably adapted to receive and access a myriad of different portable storage devices. Examples of such portable storage devices include, for example and without limitation, flash-based memory such as SD, xD, Memory Stick, compact flash, CD-ROM, DVD-ROM, USB flash drives, or other magnetic or optical storage devices, as will be known in the art.

The system 100 of FIG. 1 also includes an auditing component, illustrated as the audit server 142 and associated data storage device 144, communicatively coupled to the computer network 102 via a communications link 146. It will be appreciated by those skilled in the art that the audit server 142 comprises hardware, software, and combinations thereof suitably adapted to provide one or more services, web-base applications, monitor document processing device operations, facilitate device information gathering, providing storage options, and the like, to networked devices. In accordance with one embodiment of the subject application, the audit server 142 includes various components, implemented as hardware, software, or a combination thereof, for collecting document processing device information and generating an eXtensible Markup Language (XML) file corresponding thereto. In addition, the audit server 142 is suitably adapted to generate an electronic mail message wherein the message includes an XML attachment, as well as communicating the same to a pre-selected electronic mail address, such as a POP-3 mailbox, e.g. an address supported by a suitable electronic mail server. The communications link 146 is any suitable data communications means known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. It will be appreciated by those skilled in the art that the components described with respect to the audit server 142 hereinafter are capable of implementation on any computing device coupled to the computer network 102 and functioning as an audit server. The skilled artisan will appreciate that suitable backend server configurations include, for example and without limitation, an FMAUDIT server, or other such server, as are known in the art.

Communicatively coupled to the audit server 142 is the data storage device 144. In accordance with the preferred embodiment of the subject application, the data storage device 144 is any mass storage device, or plurality of such devices, known in the art including, for example and without limitation, magnetic storage drives, a hard disk drive, optical storage devices, flash memory devices, or any suitable combination thereof. In the preferred embodiment, the data storage device 144 is suitably adapted to store software updates, update lists, electronic database data, document data, image data, location data, advertisement data, account data, user data, and the like. It will be appreciated by those skilled in the art that while illustrated in FIG. 1 as being a separate component of the system 100, the data storage device 144 is capable of being implemented as internal storage component of the audit server 142, or the like, such as, for example and without limitation, an internal hard disk drive, or the like. The functioning of the audit server 142 will be better understood in conjunction with the illustration of FIG. 6, described in greater detail below.

The system 100 of FIG. 1 further includes an electronic mail server, i.e. the MICROSOFT EXCHANGE server 148 (exchange server 148), and a website host, e.g. the MICROSOFT SHAREPOINT server 152 (SharePoint server 152). The servers 148 and 152 comprise hardware, software, and combinations thereof suitably adapted to provide one or more services, web-base applications, document processing device command and control, storage options, and the like, to networked devices, such as the document processing devices 104 and 122, and the user device 158. The servers 148 and 152 are communicatively coupled to the computer network 102 via corresponding communications links 150 and 156. It will be appreciated by those skilled in the art that suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

Preferably, the exchange server 148 is suitably adapted to provide electronic mail services to a plurality of associated users, devices, and the like. In accordance with one embodiment of the subject application, the exchange server 148 is capable of forwarding electronic mail messages received from the audit server 142 to the SharePoint server 152. The functioning of the exchange server 148 will be better understood in conjunction with the illustration of FIG. 6, described in greater detail below.

According to one embodiment of the subject application, the SharePoint server 152 is representative of a MICROSOFT OFFICE SHAREPOINT SERVER, which corresponds to a web-based collaboration and document management platform from the MICROSOFT CORPORATION. The skilled artisan will appreciate that such an embodiment of the SharePoint server 152 is capable of hosting websites enabling access to shared workspaces and documents to a plurality of users.

Communicatively coupled to the SharePoint server 152 is the data storage device 154. In accordance with one embodiment of the subject application, the data storage device 154 is any mass storage device, or plurality of such devices, known in the art including, for example and without limitation, magnetic storage drives, a hard disk drive, optical storage devices, flash memory devices, or any suitable combination thereof. In such an embodiment, the data storage device 154 is suitably adapted to store software updates, update lists, electronic database data, document data, image data, location data, advertisement data, account data, user data, and the like. According to a preferred embodiment of the subject application, the data storage device 154 is representative of a MICROSOFT SQL Server database, as will be understood by those skilled in the art. Preferably, the storage device 154 stores XML data corresponding to device information, as will be appreciated by those skilled in the art. In addition, the skilled artisan will appreciate that while illustrated in FIG. 1 as being a separate component of the system 100, the data storage device 154 is capable of being implemented as internal storage component of the SharePoint server 152, or the like, such as, for example and without limitation, an internal hard disk drive, or the like. The functioning of the SharePoint server 152 will be better understood in conjunction with the illustration of FIG. 6, described in greater detail below.

The system 100 of FIG. 1 further includes a user device 158 suitably coupled to the computer network 102 via the communications link 162. It will be appreciated by those skilled in the art that the user device 158 is shown in FIG. 1 as a computer workstation for illustration purposes only. As will be understood by those skilled in the art, the user device 158 is representative of any personal computing device known in the art, including, for example and without limitation, a laptop computer, a personal computer, a personal data assistant, a web-enabled cellular telephone, a smart phone, a proprietary network device, or other web-enabled electronic device. The communications link 162 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. The functioning of the user device 158 will be better understood in conjunction with the diagram of FIG. 7, discussed in greater detail below.

The user device 156 depicted in FIG. 1 further includes a thin-client interface 160, such as a suitable web-based interface, e.g. a web-browser. It will be appreciated by those skilled in the art that the thin-client interface 160 is capable of being implemented as hardware, software or a suitable combination thereof of the user device 158. Preferably, the thin-client interface 160 is suitably adapted to communicate with the exchange server 148, the audit server 142, the SharePoint server 152, and the like, so as to display associated information retrieved therefrom. As the skilled artisan will appreciate, suitable web-browsers include, for example and without limitation, MICROSOFT INTERNET EXPLORER, MOZILLA FIREFOX, APPLE SAFARI, or any other web-browser known in the art.

In accordance with one embodiment of the subject application, the system 100 further includes a dashboard, as will be understood by those skilled in the art, corresponding to the graphical user interface displayed to a user via the thin-client interface 160 of the user device 158. Preferably, such a dashboard facilitates the generation of reports corresponding to data stored in the SQL database 154 and the like. Thus, as will be apparent to one skilled in the art in view of the incorporated figures and Appendices 1 and 2, the dashboard facilitates user retrieval and interaction with the SharePoint server 152 and associated SQL server database 154.

Figure 2:
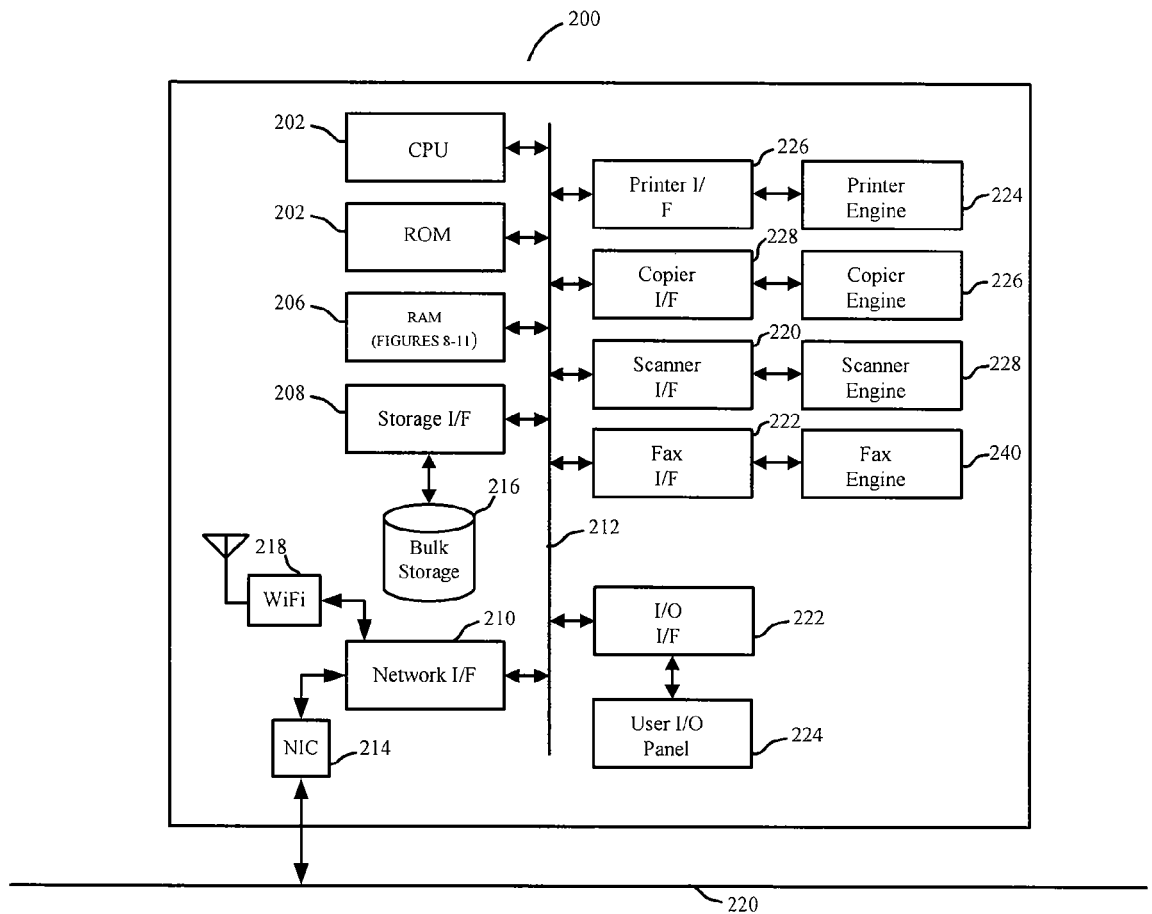
FIG. 2 is a block diagram illustrating device hardware for use in the system for document processing device operation monitoring according to one embodiment of the subject application.

Turning now to FIG. 2, illustrated is a representative architecture of a suitable device 200 (shown in FIG. 1 as the document processing devices 104 and 122) on which operations of the subject system are completed. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the device 200.

Also included in the device 200 is random access memory 206, suitably formed of dynamic random access memory, static random access memory, or any other suitable, addressable memory system. Random access memory provides a storage area for data instructions associated with applications and data handling accomplished by the processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and the network subsystem 210 is suitably accomplished via a bus data transfer mechanism, such as illustrated by bus 212.

Suitable executable instructions on the device 200 facilitate communication with a plurality of external devices, such as workstations, document processing devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with the bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
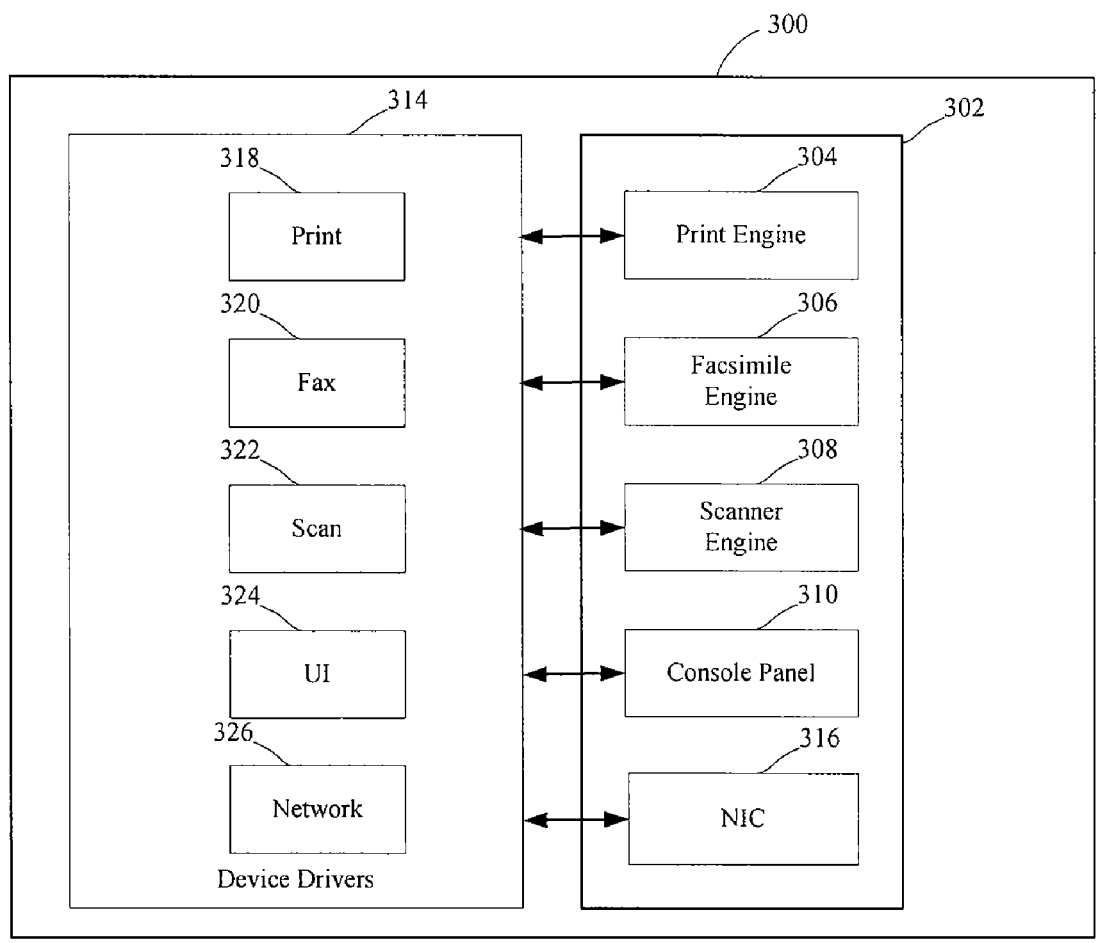
FIG. 3 is a functional diagram illustrating the device for use in the system for document processing device operation monitoring according to one embodiment of the subject application.

Turning now to FIG. 3, illustrated is a suitable document processing device for use in connection with the disclosed system. FIG. 3 illustrates suitable functionality of the hardware of FIG. 2 in connection with software and operating system functionality as will be appreciated by one of ordinary skill in the art. The document processing device 300 suitably includes an engine 302 which facilitates one or more document processing operations.

The document processing engine 302 suitably includes a print engine 304, facsimile engine 306, scanner engine 308 and console panel 310. The print engine 304 allows for output of physical documents representative of an electronic document communicated to the processing device 300. The facsimile engine 306 suitably communicates to or from external facsimile devices via a device, such as a fax modem.

The scanner engine 308 suitably functions to receive hard copy documents and in turn image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format, and is also suitably configured for optical character recognition. Tangible document scanning also suitably functions to facilitate facsimile output thereof.

In the illustration of FIG. 3, the document processing engine also comprises an interface 316 with a network via driver 326, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
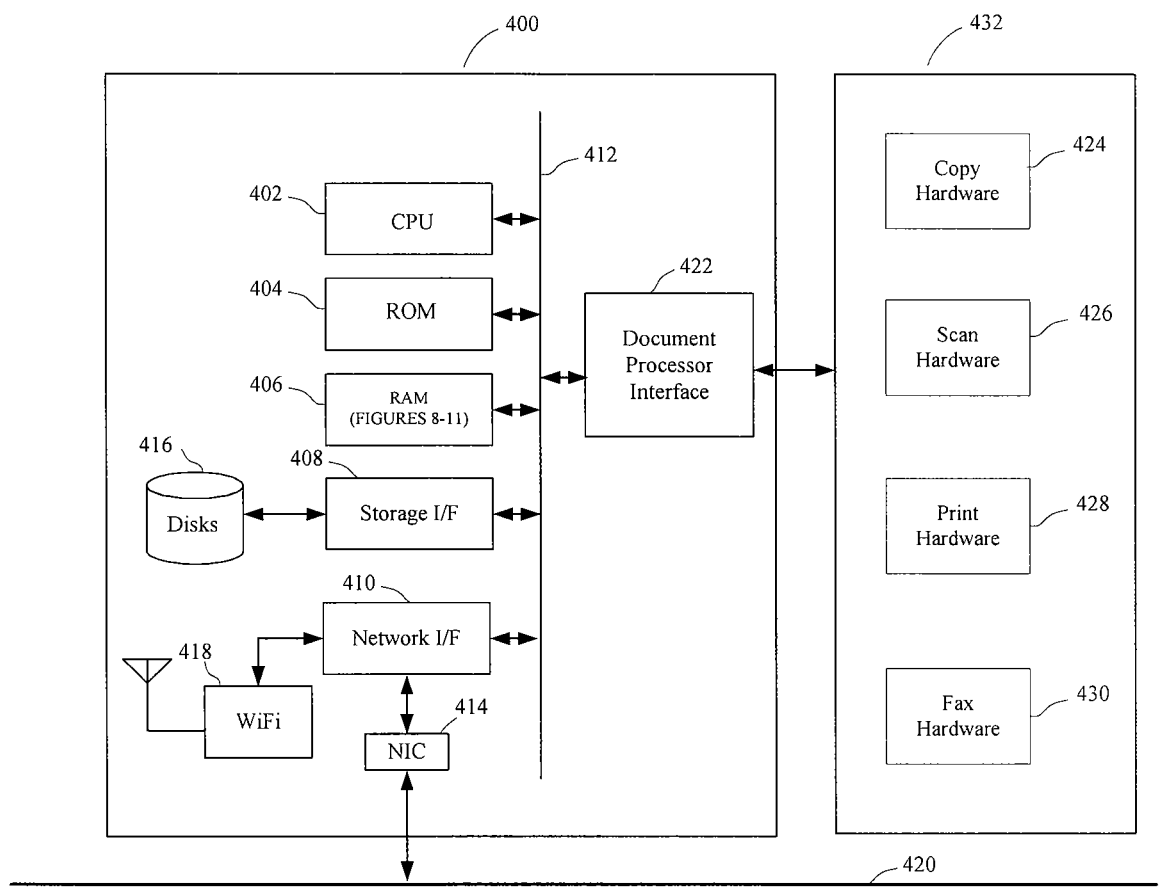
FIG. 4 is a block diagram illustrating controller hardware for use in the system for document processing device operation monitoring according to one embodiment of the subject application.

Turning now to FIG. 4, illustrated is a representative architecture of a suitable backend component, i.e., the controller 400, shown in FIG. 1 as the controllers 108 and 126, on which operations of the subject system 100 are completed. The skilled artisan will understand that the controller 400 is representative of any general computing device, known in the art, capable of facilitating the methodologies described herein. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration data, and other routines or data used for operation of the controller 400.

Also included in the controller 400 is random access memory 406, suitably formed of dynamic random access memory, static random access memory, or any other suitable, addressable and writable memory system. Random access memory provides a storage area for data instructions associated with applications and data handling accomplished by processor 402.

A storage interface 408 suitably provides a mechanism for non-volatile, bulk or long term storage of data associated with the controller 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the device 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network interface subsystem 410 is suitably accomplished via a bus data transfer mechanism, such as illustrated by the bus 412.

Also in data communication with the bus 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
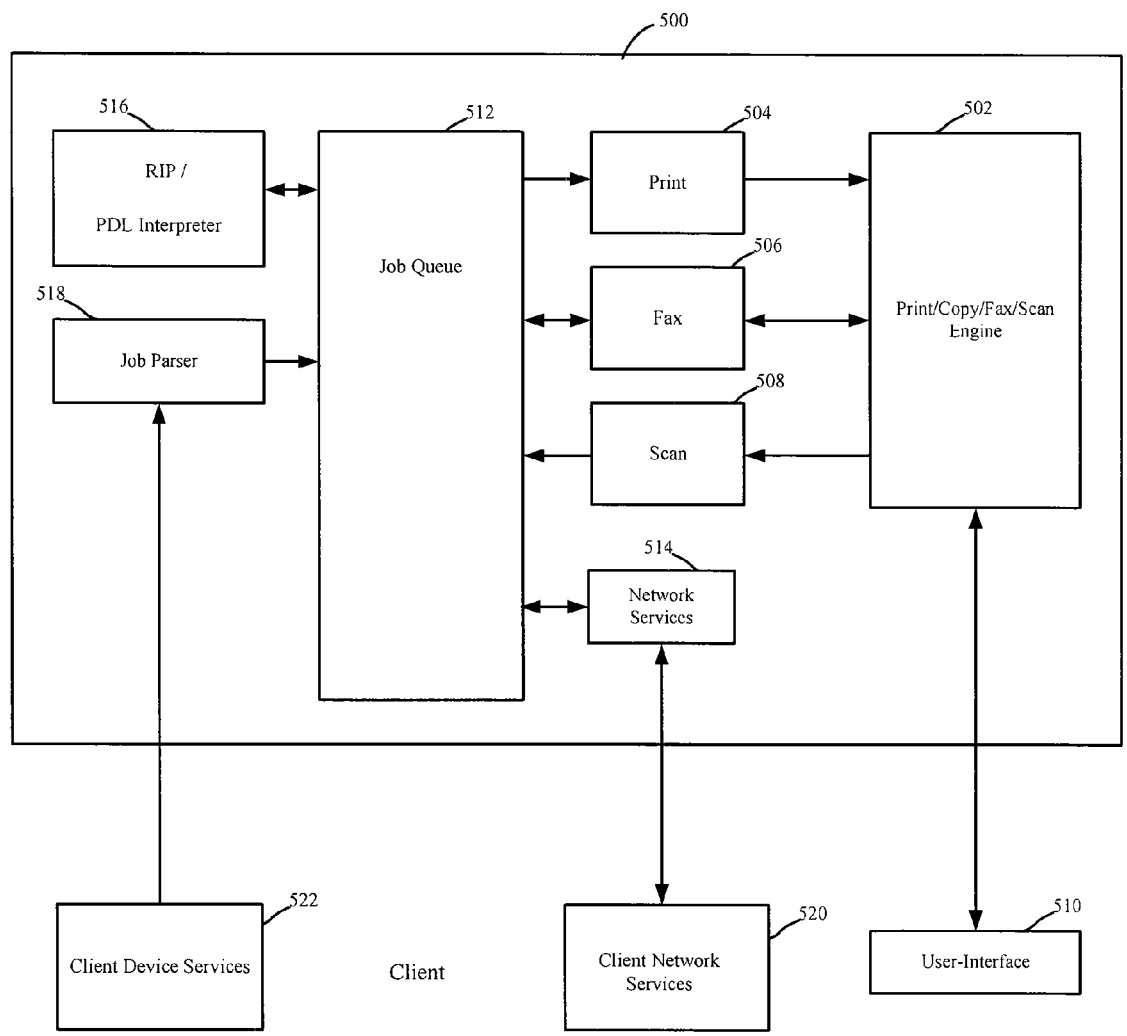
FIG. 5 is a functional diagram illustrating the controller for use in the system for document processing device operation monitoring according to one embodiment of the subject application.

Functionality of the subject system 100 is accomplished on a suitable document processing device, such as the document processing devices 104 and 122, which includes the controller 400 of FIG. 4, (shown in FIG. 1 as the controllers 108 and 126, respectively) as an intelligent subsystem associated with a document processing device. In the illustration of FIG. 5, controller function 500 in the preferred embodiment includes a document processing engine 502. A suitable controller functionality is that incorporated into the Toshiba e-Studio system in the preferred embodiment. FIG. 5 illustrates suitable functionality of the hardware of FIG. 4 in connection with software and operating system functionality as will be appreciated by one of ordinary skill in the art.

In the preferred embodiment, the engine 502 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document processing devices that perform one or more of the document processing operations listed above.

The engine 502 is suitably interfaced to a user interface panel 510, which panel allows for a user or administrator to access functionality controlled by the engine 502. Access is suitably enabled via an interface local to the controller, or remotely via a remote thin or thick client.

The engine 502 is in data communication with the print function 504, facsimile function 506, and scan function 508. These functions facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 508 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser suitably functions to receive print job language files from an external device, such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the afore-described functionality and components.

Figure 6:
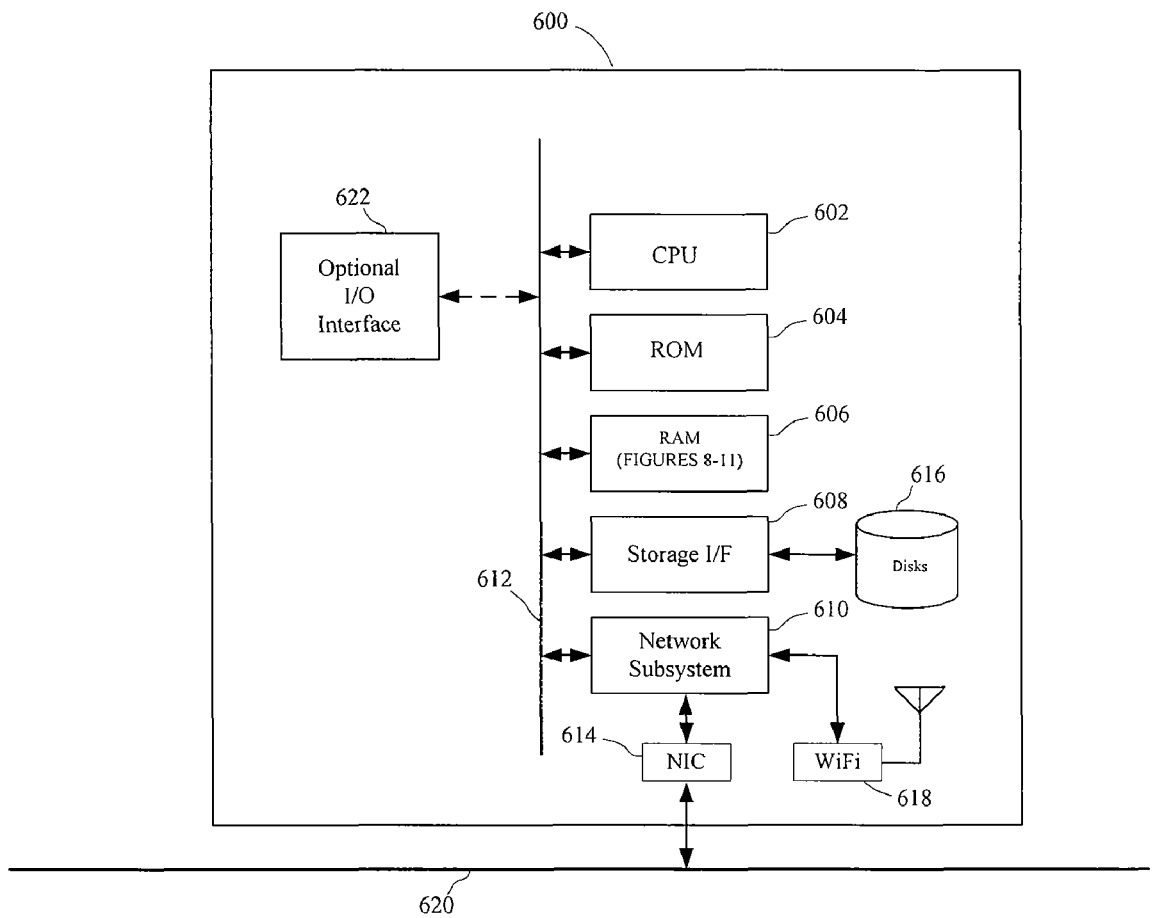
FIG. 6 is a functional diagram illustrating a server for use in the system for document processing device operation monitoring according to one embodiment of the subject application.

Turning now to FIG. 6, illustrated is a representative architecture of a suitable server 600 (shown in FIG. 1 as the servers 142, 148, and 152) on which operations of the subject system are completed. Included is a processor 602, suitably comprised of a central processor unit. However, it will be appreciated that processor 602 may advantageously be composed of multiple processors working in concert with one another as will be appreciated by one of ordinary skill in the art. Also included is a non-volatile or read only memory 604 which is advantageously used for static or fixed data or instructions, such as BIOS functions, system functions, system configuration, and other routines or data used for operation of the server 600.

Also included in the server 600 is random access memory 606, suitably formed of dynamic random access memory, static random access memory, or any other suitable, addressable memory system. Random access memory provides a storage area for data instructions associated with applications and data handling accomplished by the processor 602.

A storage interface 608 suitably provides a mechanism for volatile, bulk or long term storage of data associated with the server 600. The storage interface 608 suitably uses bulk storage, such as any suitable addressable or serial storage, such as a disk, optical, tape drive and the like as shown as 616, as well as any suitable storage medium as will be appreciated by one of ordinary skill in the art.

A network interface subsystem 610 suitably routes input and output from an associated network allowing the server 600 to communicate to other devices. The network interface subsystem 610 suitably interfaces with one or more connections with external devices to the server 600. By way of example, illustrated is at least one network interface card 614 for data communication with fixed or wired networks, such as Ethernet, token ring, and the like, and a wireless interface 618, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 614 is interconnected for data interchange via a physical network 620, suitably comprised of a local area network, wide area network, or a combination thereof.

Data communication between the processor 602, read only memory 604, random access memory 606, storage interface 608, and the network subsystem 610 is suitably accomplished via a bus data transfer mechanism, such as illustrated by bus 612.

Suitable executable instructions on the server 600 facilitate communication with a plurality of external devices, such as workstations, document processing devices, other servers, or the like. While, in operation, a typical server operates autonomously, it is to be appreciated that direct control by a local user is sometimes desirable, and is suitably accomplished via an optional input/output interface 622 as will be appreciated by one of ordinary skill in the art.

Figure 7:
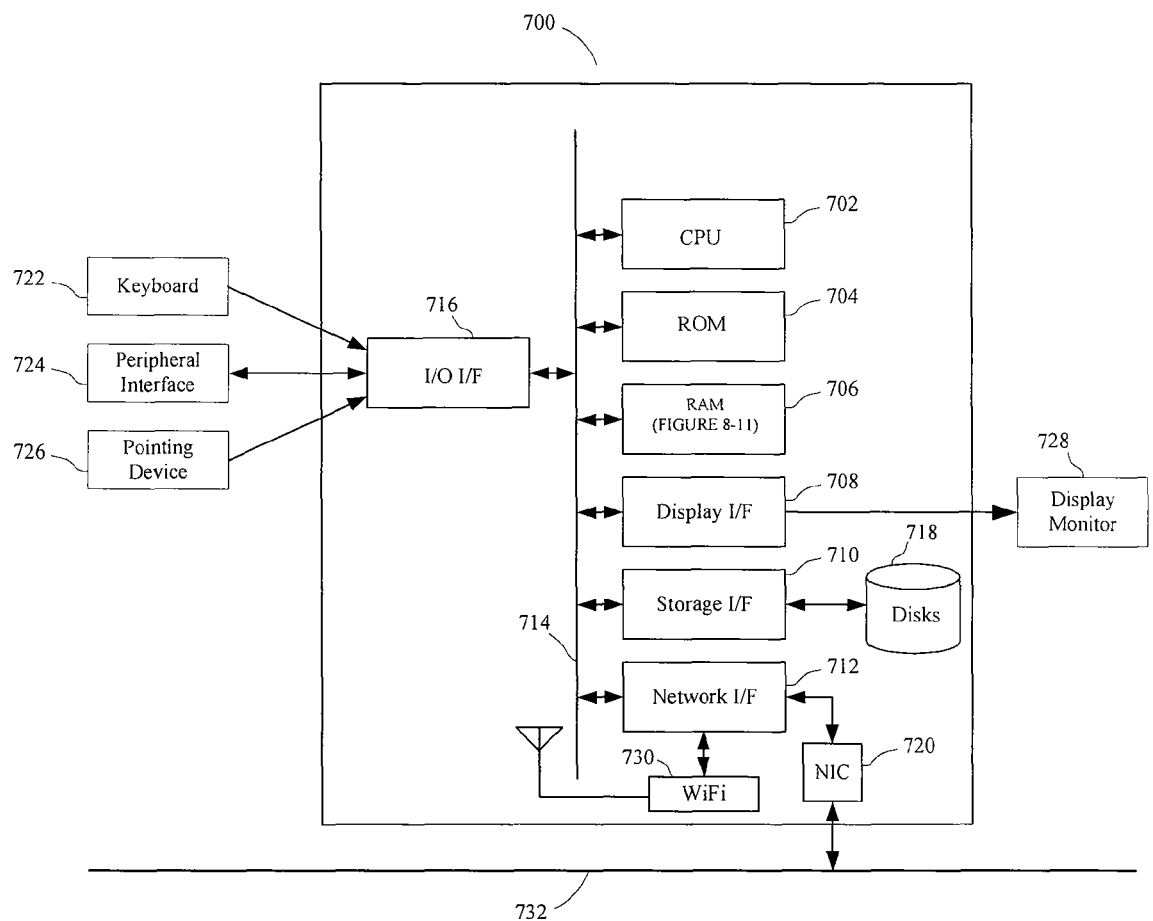
FIG. 7 is a functional diagram illustrating a workstation for use in the system for document processing device operation monitoring according to one embodiment of the subject application.

Turning now to FIG. 7, illustrated is a hardware diagram of a suitable workstation 700, shown in FIG. 1 as the user device 158, for use in connection with the subject system. A suitable workstation includes a processor unit 702 which is advantageously placed in data communication with read only memory 704, suitably non-volatile read only memory, volatile read only memory or a combination thereof, random access memory 706, display interface 708, storage interface 710, and network interface 712. In a preferred embodiment, interface to the foregoing modules is suitably accomplished via a bus 714.

The read only memory 704 suitably includes firmware, such as static data or fixed instructions, such as BIOS, system functions, configuration data, and other routines used for operation of the workstation 700 via CPU 702.

The random access memory 706 provides a storage area for data and instructions associated with applications and data handling accomplished by the processor 702.

The display interface 708 receives data or instructions from other components on the bus 714, which data is specific to generating a display to facilitate a user interface. The display interface 708 suitably provides output to a display terminal 728, suitably a video display device such as a monitor, LCD, plasma, or any other suitable visual output device as will be appreciated by one of ordinary skill in the art.

The storage interface 710 suitably provides a mechanism for non-volatile, bulk or long term storage of data or instructions in the workstation 7700. The storage interface 710 suitably uses a storage mechanism, such as storage 718, suitably comprised of a disk, tape, CD, DVD, or other relatively higher capacity addressable or serial storage medium.

The network interface 712 suitably communicates to at least one other network interface, shown as network interface 720, such as a network interface card, and wireless network interface 730, such as a WiFi wireless network card. It will be appreciated that by one of ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by one of ordinary skill in the art. In the illustration, the network interface 720 is interconnected for data interchange via a physical network 732, suitably comprised of a local area network, wide area network, or a combination thereof.

An input/output interface 716 in data communication with the bus 714 is suitably connected with an input device 722, such as a keyboard or the like. The input/output interface 716 also suitably provides data output to a peripheral interface 724, such as a USB, universal serial bus output, SCSI, Firewire (IEEE 1394) output, or any other interface as may be appropriate for a selected application. Finally, the input/output interface 716 is suitably in data communication with a pointing device interface 726 for connection with devices, such as a mouse, light pen, touch screen, or the like.

Figure 8:
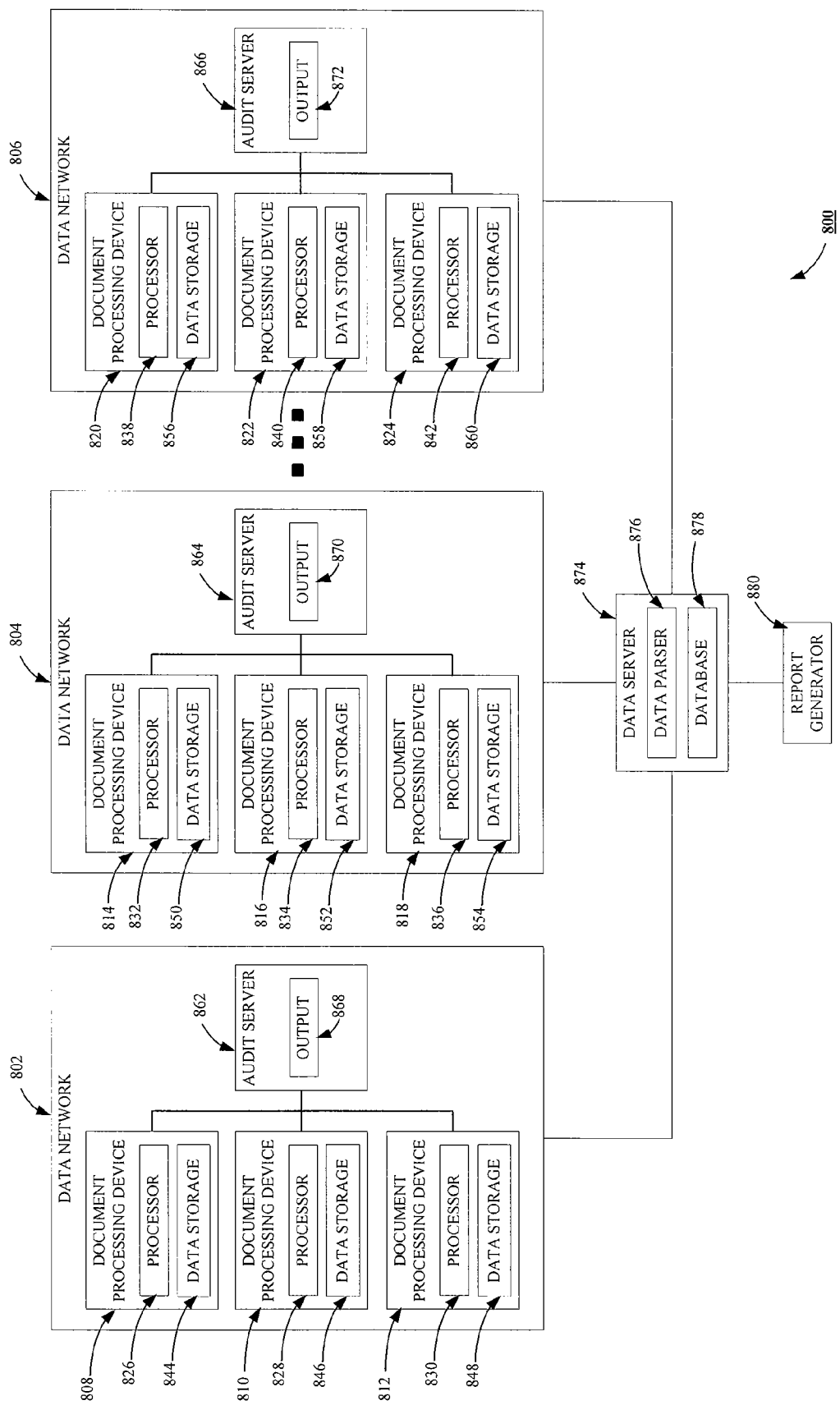
FIG. 8 is a block diagram illustrating the system for document processing device operation monitoring according to one embodiment of the subject application.

Referring now to FIG. 8, illustrated is a block diagram of system 800 for document processing device operation monitoring in accordance with one embodiment of the subject application. As shown in FIG. 8, the system 800 includes a plurality of data networks 802, 804, and 806, each data network 802-806 including a respective plurality of document processing devices 808, 810, 812, 814, 816, 818, 820, 822, and 824. In accordance with one embodiment of the subject application, each document processing device 808-824 of the system 800 includes a processor 826, 828, 830, 832, 834, 836, 840, and 842, and associated data storage 844, 846, 848, 850, 852, 854, 856, 858, and 860, respectively. In such an embodiment, each data storage 844-860 includes operational data corresponding to operational characteristics of the respective document processing device 808-824.

The system 800 further includes a plurality of audit servers 862, 864, and 866 in data communication with each of the document processing devices 808-812, 814-818, and 820-824 based upon the associated data network 802, 804 or 806.

Preferably, each audit server 862-866 is operable to receive operational data from each document processing device 808-812, 814-818, or 820-824 in its associated network 802, 804, or 806. The system 800 also incorporates an output 868, 870, and 872 associated with each audit server 862-866 configured to communicate operational data from each associated document processing device 808-812, 814-818, and 820-824 in a thin client language via attachment to an associated electronic mail message (e-mail).

In addition, the system 800 employs a data server 874 operable to receive e-mail from each audit server 862-866. Associated with the data server 874 is a data parser 876 configured to parse operational data from each e-mail received from the audit servers 862-866. The data server 874 further includes an associated database 878 operable to store operational data parsed from e-mail received from each audit server 862-866. The system 800 further includes a report generator 880 operable to selectively generate device reports in accordance with a query to the database 878.

Figure 9:
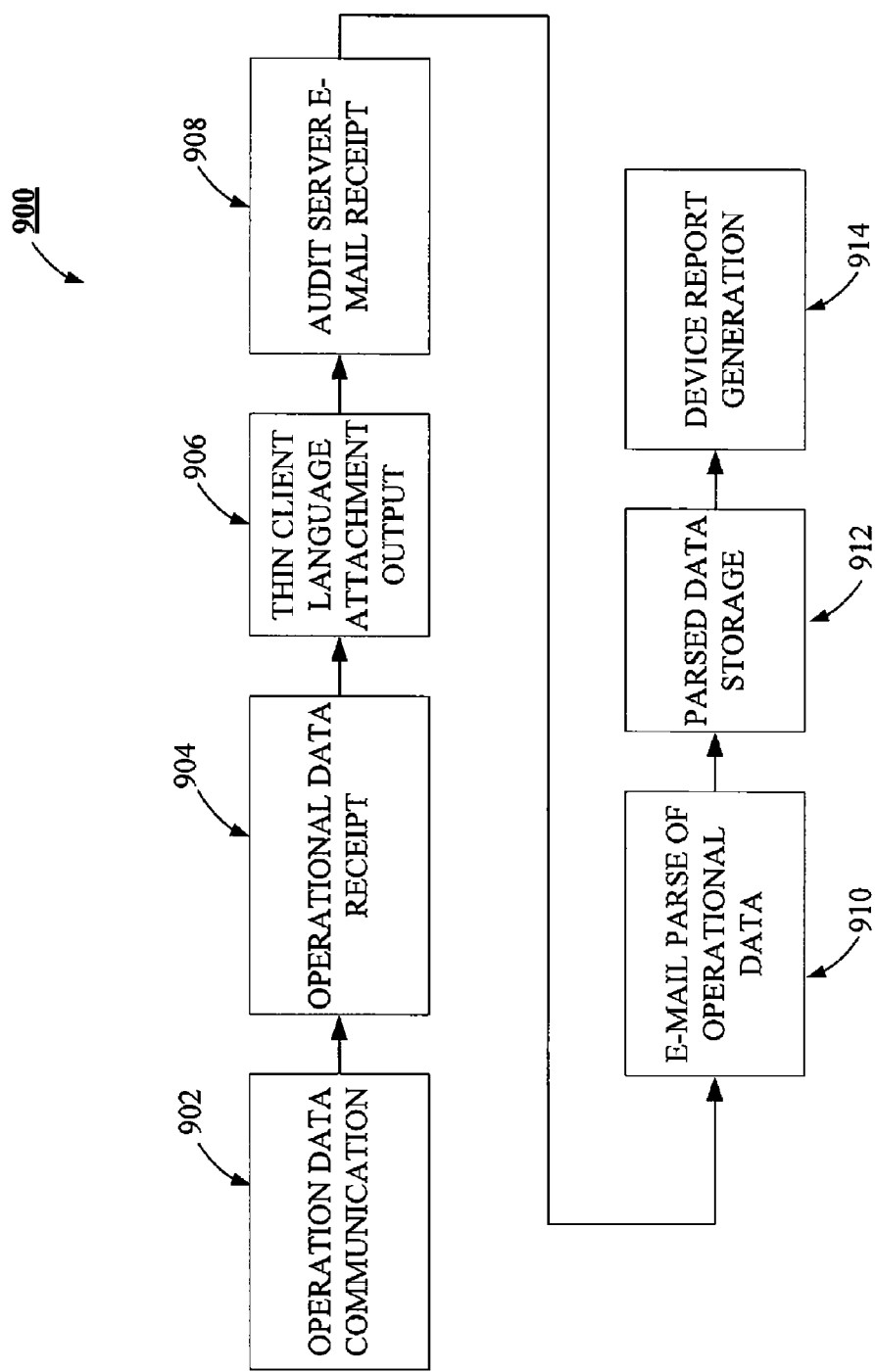
FIG. 9 is a functional diagram illustrating the system for document processing device operation monitoring according to one embodiment of the subject application.

Turning now to FIG. 9, illustrated is a functional diagram of a system 900 for document processing device operation monitoring in accordance with one embodiment of the subject application. As shown in FIG. 9, operation data communication 902 first occurs between document processing devices on one of a plurality of networks with an assigned one of a plurality of an audit servers. Operational data receipt 904 is then performed by each of the audit servers of the operational data from each document processing device in its associated network.

Next, thin client language attachment output 906 is performed by each audit server of operational from each associated document processing device via attachment to an associated e-mail. Audit server e-mail receipt 908 then occurs by a data server of the e-mails from each audit server. E-mail parse of operational data 910 is then performed via the data server of the operational data contained in the attachment from each e-mail received from the audit servers. Parsed data storage 912 is then performed of the parsed data in a database associated with the data server. Thereafter, device report generation 914 occurs in accordance with a query to the database.

Figure 10:
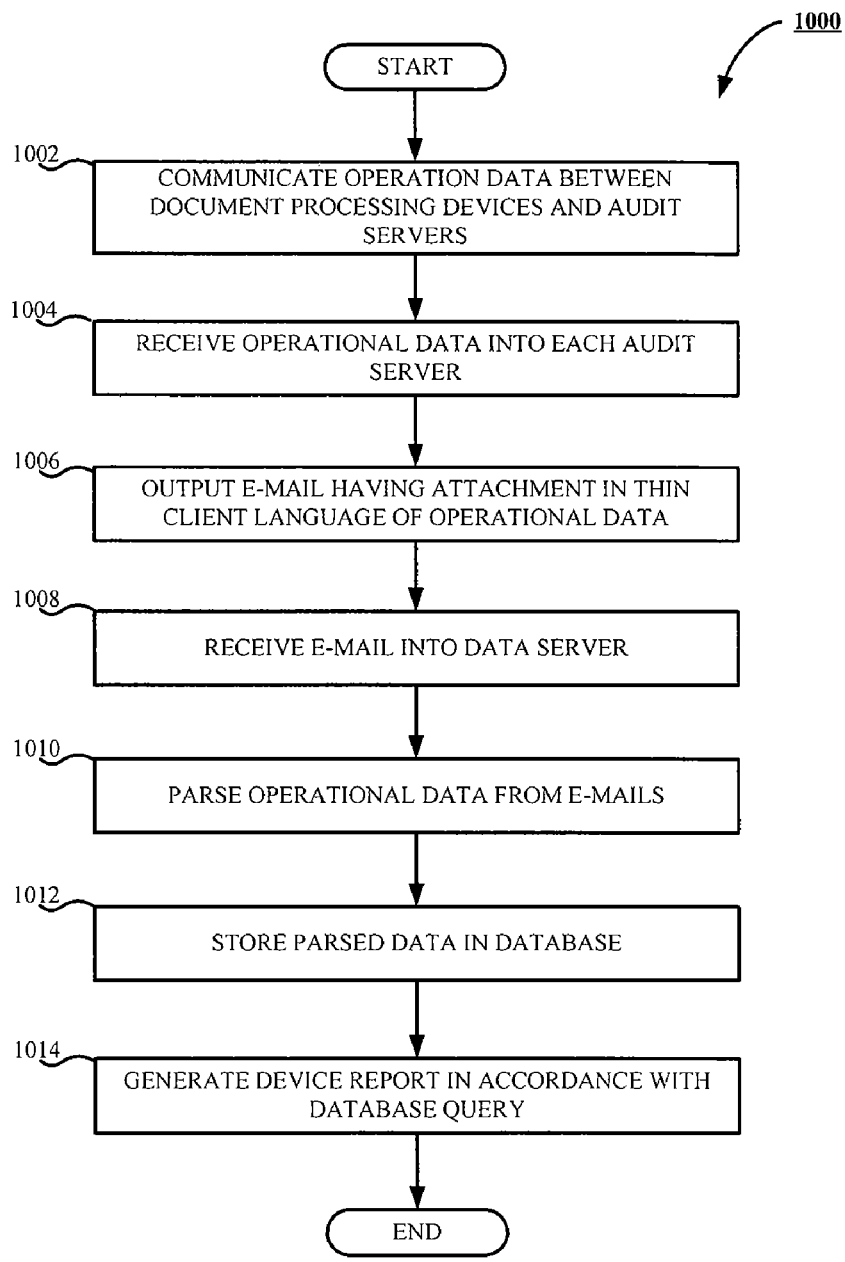
FIG. 10 is a flowchart illustrating a method for document processing device operation monitoring according to one embodiment of the subject application.

The skilled artisan will appreciate that the subject system 100 and components described above with respect to FIG. 1, FIG. 2, FIG. 3, FIG. 4, FIG. 5, FIG. 6, FIG. 7, FIG. 8, and FIG. 9 will be better understood in conjunction with the methodologies described hereinafter with respect to FIG. 10 and FIG. 11. Turning now to FIG. 10, there is shown a flowchart 1000 illustrating a method for document processing device operation monitoring in accordance with one embodiment of the subject application. Beginning at step 1002, operation data is communicated between the document processing devices of each network with an audit server assigned to the respective network. At step 1004, each of the audit servers receives the operational data from each document processing device on the associated network.

Each audit server then outputs, at step 1006, operational data from each associated document processing device in a thin client language via attachment to an associated electronic mail message (e-mail). At step 1008, an e-mail from each audit server is received into a data server. Via the data server, the operational data is parsed from each e-mail received from the audit servers at step 1010. The parsed data is then stored, at step 1012, in a database associated with the data server. Thereafter, at step 1014, a device report is generated in accordance with a query to the database.

Figure 11:
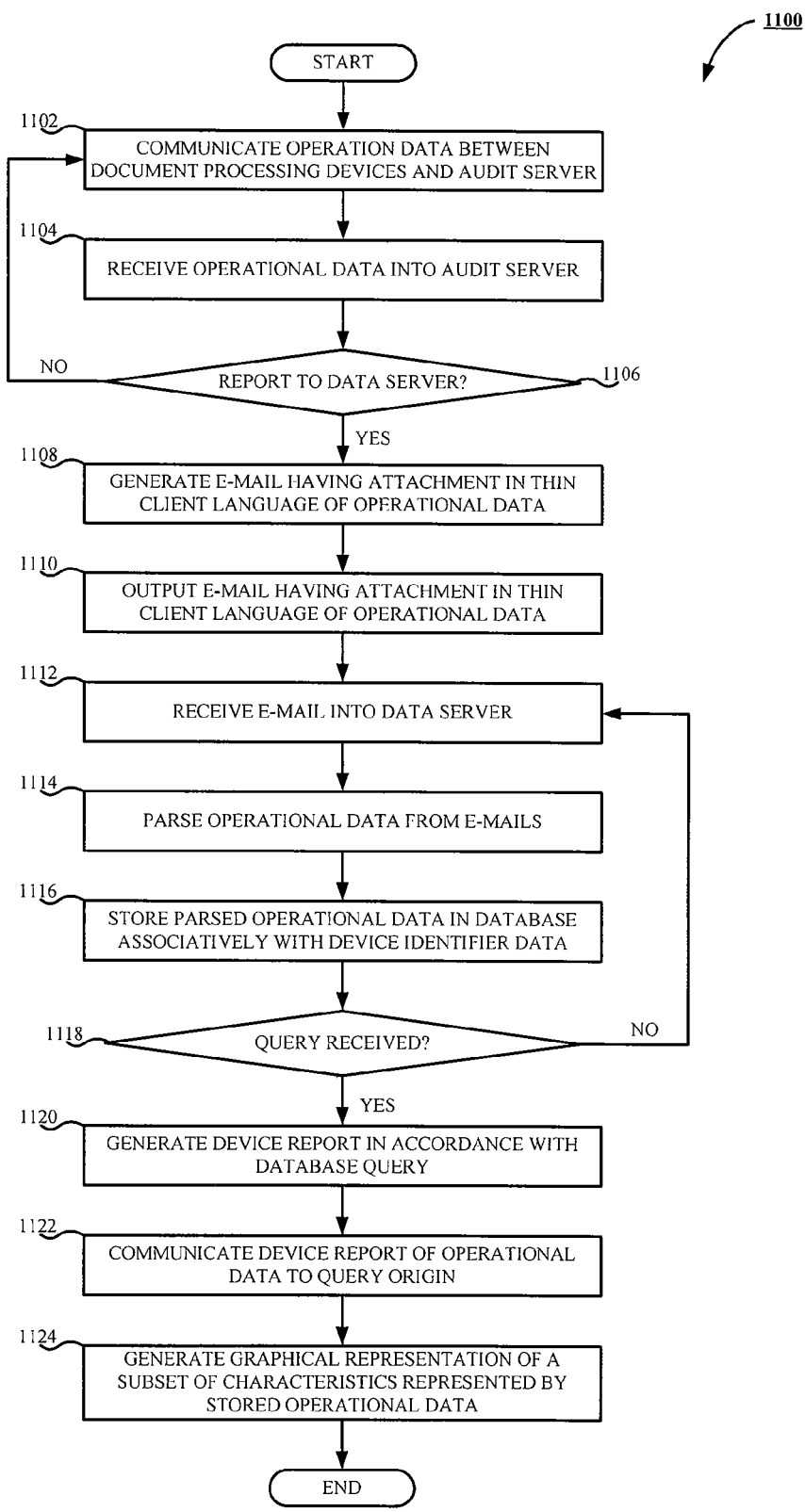
FIG. 11 is a flowchart illustrating a method for document processing device operation monitoring according to one embodiment of the subject application.

Referring now to FIG. 11, there is shown a flowchart 1100 illustrating a method for document processing device operation monitoring in accordance with one embodiment of the subject application. For example purposes only, reference is made hereinafter to the method of FIG. 11 implemented via the first document processing device 104. The skilled artisan will appreciate that either such device 104 or 122 is capable of being implemented in accordance with the subject application. The methodology of FIG. 11 begins at step 1102, whereupon operational data is communicated between the document processing devices 104 and 122 and the audit server 142. It will be appreciated by those skilled in the art that while reference is made to FIG. 11 in view of a single data network 102, multiple such networks, with associated devices, are also capable of employing the methodology of FIG. 11. The skilled artisan will further appreciate that suitable operational data includes, for example and without limitation, usage data corresponding to device usage, consumable data corresponding to consumables used during device operation, function data corresponding to available document processing functions, device identifier data corresponding to device model, and the like.

At step 1104, the operational data is received from each communicating document processing device 104 and 122 by the audit server 142 and stored in the associated data storage 144. A determination is then made by the audit server 142 at step 1106 whether it is time to report the received operational data to the data server, e.g. the server 152. That is, whether or not a predetermined condition, event, or the like, has occurred indicating a report is to be communicated to the data server 152, e.g. a predetermined period of time, a number of devices 104 and 122 have reported, an amount of data on the data storage 144 has been achieved, or other suitable triggering events. It will be appreciated by those skilled in the art that while the servers 142, 148, and 152 are all illustrated in FIG. 1 as separate devices communicatively coupled to the computer network 102, such server functionality is capable of being performed by any single device, or a plurality of server devices distributed across the network 102. Upon a determination at step 1106 that a report to the data server 152 is not due, flow returns to step 1102, whereupon operational data is continued to be communicated from the document processing devices 104 and 122 to the audit server 142.

When it is determined at step 1106 that a report is due to the data server 152, flow progresses to step 1108. At step 1108, the audit server 142 generates an electronic mail (e-mail) message addressed to the data server 152 having an attachment in a thin client language corresponding to the operational data received from the document processing devices 104 and 122. According to one embodiment of the subject application, the thin client language is an extensible markup language. At step 1110, the audit server 142 outputs the e-mail with attachment to the data server 152. It will be appreciated by those skilled in the art that such output is capable of comprising communicating the message to the mail server 148 via the computer network 102, as is known in the art. According to one embodiment of the subject application, the e-mail is capable of being communicated directly to the data server 152 from the audit server 142 thereby bypassing the mail server 148.

At step 1112, the data server 152 receives the e-mail with attachment output by the audit server 142. The data server 152 then parses the operational data from the e-mail message at step 1114. At step 1116, the parsed operational data is stored in the database 154 associatively with device identifier data corresponding to the document processing device 104 or 122 from which such operational data corresponds. In accordance with one embodiment of the subject application, the database 154 is comprised of a structured query language database, such as an SQL Database from MICROSOFT CORPORATION, or other suitable structured database as is known in the art.

A determination is then made at step 1118 by the data server 152 whether a database query has been received, e.g. a query from an administrator or user associated with the user device 158. According to one embodiment of the subject application, a user via the thin client interface 160 operable on the user device 158 communicates a query for database information to the data server 152 via the network 102. When no query has been received, flow returns to step 1112, whereupon the data server 152 continues to receive e-mail messages from the audit server 142. Following receipt of a query at step 118, operations proceed to step 1120, whereupon the data server 152 generates a device report in accordance with the received database query. The data server 152 then communicates, via any suitable means known in the art, the device report to the query origin, i.e. the user device 158. Thereafter, at step 1124, the user device 158 or other suitable query origin device generates a graphical representation of a subset of characteristics represented by the operational data stored in the database. For example, the user device 158 generates a graphical representation of the operational data of a document processing device 104 or 122 via the thin client interface 160.

As previously set forth above, additional data networks (depicted in FIG. 8) are also capable of following steps 1102-1116 so as to report operational data to the data server 152. Thus, the user device 158 is capable of querying the database 154 for operational data pertaining to document processing devices 808-824 communicated by the audit servers 862-866 to the data server 874.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A system for document processing device operation monitoring comprising:
   a plurality of data networks, each data network including a plurality of document processing devices;
   each document processing device including a processor and associated data storage, the data storage including operational data corresponding to operational characteristics;
   a plurality of audit servers, at least one of the plurality of audit server in data communication with each of the plurality of document processing devices on the data network associated therewith, each of the at least one of the plurality of audit server operable to receive operational data from each document processing device;
   an output associated with each audit server operative to communicate operational data from each associated document processing device in a thin client language via attachment to an e-mail;

a data server operable to receive e-mail from each audit server;

a data parser associated with the data server operable to parse operational data from each e-mail received from each audit server;

a database associated with the data server operable to store operational data parsed from e-mail received from each audit server; and a report generator operable to selectively generate device reports in accordance with the results of a query to the database.

2. The system of claim 1 wherein the thin client language is comprised of extensible markup language.

3. The system of claim 2 wherein the database is comprised of a structured query language database.

4. The system of claim 3 wherein the database stores operational data associated with device identifier data corresponding to a particular document processing device.

5. The system of claim 4 wherein the operational data includes usage data corresponding to device usage, consumable data corresponding to consumables used during device operation, function data corresponding to available document processing functions, and device identifier data corresponding to device model.

6. The system of claim 5 further comprising a dashboard generator operable to generate a graphical representation of a subset of characteristics represented by the operational data stored in the database.

7. A method for remote monitoring of document processing devices comprising the steps of:
communicating operation data between document processing devices on one of a plurality of networks with one of a plurality of audit servers assigned to each of the plurality of networks;
receiving into at least one of the plurality of audit servers operational data from each document processing device;
outputting, from each audit server, operational data from each associated document processing device in a thin client language via attachment to an e-mail;
receiving, into a data server, e-mail from each audit server;
parsing, via the data server, operational data from each e-mail received from each audit server;
storing parsed data in a database associated with the data server; and
generating a device report in accordance with a query to the database.

8. The method of claim 7 wherein the thin client language is comprised of extensible markup language.

9. The method of claim 8 wherein the database is comprised of a structured query language database.

10. The method of claim 9 further comprising the step of storing the operational data in the database associated with device identifier data corresponding to a particular document processing device.

11. The method of claim 10 wherein the operational data includes usage data corresponding to device usage, consumable data corresponding to consumables used during device operation, function data corresponding to available document processing functions, and device identifier data corresponding to device model.

12. The system of claim 11 further comprising the step of generating a graphical representation of a subset of characteristics represented by the operational data stored in the database.

13. A system for remote monitoring of document processing devices comprising:
a plurality of data networks, each data network including a plurality of document processing devices;
each document processing device including a processor and associated data storage, the data storage including operational data corresponding to operational characteristics;
a plurality of audit servers, at least one of the audit server in data communication with each of the plurality of document processing devices on the data network associated therewith, each audit server operable to receive operational data from each document processing device in its associated network;
means for communicating operation data between document processing devices on one of the plurality of networks with one of the plurality of audit servers;
means for receiving into at least one of the plurality of audit servers operational data from each document processing device;
means for outputting, from each audit server, operational data from each of the plurality of document processing devices in a thin client language via attachment to an associated e-mail;
means for receiving, into a data server, e-mail from each audit server;
means for parsing, via the data server, operational data from each e-mail received from the audit server;
means for storing parsed data in a database associated with the data server; and
means for generating a device report in accordance with the results of a query to the database.

14. The system of claim 13 wherein the thin client language is comprised of extensible markup language.

15. The system of claim 14 wherein the database is comprised of a structured query language database.

16. The system of claim 15 further comprising means for storing the operational data in the database associated with device identifier data corresponding to a particular document processing device.

17. The method of claim 16 wherein the operational data includes usage data corresponding to device usage, consumable data corresponding to consumables used during device operation, function data corresponding to available document processing functions, and device identifier data corresponding to device model.

18. The system of claim 17 further comprising means adapted for generating a graphical representation of a subset of characteristics represented by the operational data stored in the database.

* * * * *